United States Patent
Nice et al.

(10) Patent No.: US 10,438,268 B2
(45) Date of Patent: Oct. 8, 2019

(54) RECOMMENDER SYSTEM

(75) Inventors: Nir Nice, Kfar Veradim (IL); Noam Koenigstein, Ra'anana (IL); Ulrich Paquet, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 710 days.

(21) Appl. No.: 13/369,318

(22) Filed: Feb. 9, 2012

(65) Prior Publication Data
US 2013/0211950 A1 Aug. 15, 2013

(51) Int. Cl.
*G06Q 30/06* (2012.01)

(52) U.S. Cl.
CPC .................. *G06Q 30/0631* (2013.01)

(58) Field of Classification Search
None
See application file for complete search history.

(56) References Cited

U.S. PATENT DOCUMENTS

| | | | | |
|---|---|---|---|---|
| 6,041,311 | A * | 3/2000 | Chislenko | G06F 17/30699 705/26.7 |
| 6,049,777 | A * | 4/2000 | Sheena | G06F 17/30699 705/26.2 |
| 6,092,049 | A * | 7/2000 | Chislenko | G06F 17/30699 705/7.29 |
| 6,801,909 | B2 | 10/2004 | Delgado et al. | |
| 6,912,505 | B2 * | 6/2005 | Linden | G06Q 30/02 705/14.53 |
| 7,440,943 | B2 | 10/2008 | Grasso et al. | |
| 7,644,427 | B1 | 1/2010 | Horvitz et al. | |
| 7,668,821 | B1 * | 2/2010 | Donsbach | G06F 17/30867 707/765 |
| 7,689,457 | B2 * | 3/2010 | Chan | G06F 17/30867 705/14.53 |
| 7,689,585 | B2 | 3/2010 | Zeng et al. | |
| 7,720,720 | B1 | 5/2010 | Sharma et al. | |
| 7,743,059 | B2 * | 6/2010 | Chan | G06F 17/30867 705/26.7 |
| 7,809,601 | B2 * | 10/2010 | Shaya | G06Q 30/02 700/233 |
| 7,870,031 | B2 | 1/2011 | Bolivar | |
| 8,001,105 | B2 | 8/2011 | Bolivar et al. | |
| 8,019,777 | B2 | 9/2011 | Hauser | |

(Continued)

FOREIGN PATENT DOCUMENTS

| | | |
|---|---|---|
| CN | 102360364 A | 2/2012 |
| JP | 2012099115 A | 5/2012 |

(Continued)

OTHER PUBLICATIONS

Yehuda Korean et al., "Matrix Factorization Techniques for Recommender Systems", 2009 https://datajobs.com/data-science-repo/Recommender-Systems-%5BNetflix%5D.pdf.*

(Continued)

*Primary Examiner* — Kathleen Palavecino
*Assistant Examiner* — Lance Y Cai

(57) ABSTRACT

Embodiments of the invention provide methods and apparatus for recommending items from a catalog of items to a user by parsing the catalog of items into a plurality of catalog clusters of related items and recommending catalog items to the user from catalog clusters to which items previously preferred by the user belong.

20 Claims, 3 Drawing Sheets

(56) References Cited

U.S. PATENT DOCUMENTS

| | | | | |
|---|---|---|---|---|
| 8,019,782 | B2* | 9/2011 | Song | G06K 9/6272 707/791 |
| 8,046,363 | B2* | 10/2011 | Cha | G06F 17/3071 707/739 |
| 8,090,673 | B2 | 1/2012 | Evans | |
| 8,095,521 | B2* | 1/2012 | Chan | G06Q 30/02 707/705 |
| 8,260,656 | B1* | 9/2012 | Harbick | G06Q 30/02 705/26.7 |
| 8,290,811 | B1* | 10/2012 | Robinson | G06Q 30/0201 705/14.53 |
| 8,301,624 | B2* | 10/2012 | Park | G06F 17/30699 707/723 |
| 8,306,975 | B1* | 11/2012 | Eldering | G06Q 50/00 707/732 |
| 8,438,052 | B1 | 5/2013 | Chanda et al. | |
| 8,484,140 | B2* | 7/2013 | Thompson | G06K 9/6254 706/12 |
| 8,504,567 | B2 | 8/2013 | Billawala et al. | |
| 9,767,204 | B1 | 9/2017 | Hoover | |
| 9,767,417 | B1 | 9/2017 | Hoover | |
| 2003/0093793 | A1 | 5/2003 | Gutta | |
| 2003/0097300 | A1* | 5/2003 | Gutta | G06Q 30/0255 705/14.53 |
| 2003/0120630 | A1* | 6/2003 | Tunkelang | G06F 17/30477 |
| 2003/0233370 | A1 | 12/2003 | Barabas et al. | |
| 2005/0131897 | A1 | 6/2005 | Grasso et al. | |
| 2005/0193002 | A1 | 9/2005 | Souders et al. | |
| 2006/0041548 | A1 | 2/2006 | Parsons et al. | |
| 2007/0192308 | A1* | 8/2007 | Wei | G06F 17/30707 |
| 2008/0027925 | A1 | 1/2008 | Li et al. | |
| 2008/0189253 | A1 | 8/2008 | Oliver et al. | |
| 2008/0243637 | A1 | 10/2008 | Chan et al. | |
| 2009/0006290 | A1 | 1/2009 | Gunawardana et al. | |
| 2009/0083126 | A1 | 3/2009 | Koren et al. | |
| 2009/0089246 | A1 | 4/2009 | Chi | |
| 2009/0157479 | A1 | 6/2009 | Caldwell et al. | |
| 2010/0030578 | A1* | 2/2010 | Siddique | G06Q 10/0637 705/3 |
| 2010/0100416 | A1 | 4/2010 | Herbrich et al. | |
| 2010/0100516 | A1 | 4/2010 | Zhou et al. | |
| 2010/0268661 | A1 | 10/2010 | Levy et al. | |
| 2010/0332539 | A1* | 12/2010 | Mohan | G06F 17/30598 707/776 |
| 2011/0061069 | A1 | 3/2011 | Arte et al. | |
| 2011/0112981 | A1 | 5/2011 | Park et al. | |
| 2011/0112994 | A1 | 5/2011 | Goto et al. | |
| 2011/0179081 | A1 | 7/2011 | Ovsjanikov et al. | |
| 2011/0184806 | A1 | 7/2011 | Chen et al. | |
| 2011/0191311 | A1 | 8/2011 | Polonsky et al. | |
| 2011/0246573 | A1 | 10/2011 | Liu et al. | |
| 2011/0302165 | A1* | 12/2011 | Ishii | G06Q 30/0282 707/737 |
| 2012/0078829 | A1 | 3/2012 | Bodor et al. | |
| 2012/0246161 | A1* | 9/2012 | Murakami | H04N 21/252 707/737 |
| 2012/0254188 | A1* | 10/2012 | Koperski | G06F 17/30663 707/740 |
| 2012/0278127 | A1* | 11/2012 | Kirakosyan | G06Q 30/0631 705/7.29 |
| 2012/0278331 | A1 | 11/2012 | Campbell et al. | |
| 2013/0211950 | A1 | 8/2013 | Nice et al. | |
| 2013/0218907 | A1 | 8/2013 | Nice et al. | |
| 2014/0180790 | A1 | 6/2014 | Boal | |
| 2017/0300994 | A1 | 10/2017 | Lavee et al. | |

FOREIGN PATENT DOCUMENTS

| | | |
|---|---|---|
| WO | 9529451 A1 | 11/1995 |
| WO | 2014035048 A1 | 3/2014 |

OTHER PUBLICATIONS

Yehuda Koren et al., "Matrix Factorization Techniques for Recommender Systems", 2009 https://datajobs.com/data-science-repo/Recommender-Systems%5BNetflix%5D.pdf.*

Natasha Przulj, "Introduction to Bioinformatics," 2010 www.doc.ic.ac.uk/~natasha/341_lec_14-15.ppt.*

Aiwu Xu, "Dynamic Social Network Analysis Using Latent Space Model and an Integrated Clustering Algorithm," 2009 Dependable, Autonomic and Secure Computing, 2009. DASC '09. Eighth IEEE International Conference http://ieeexplore.ieee.org/xpls/abs_all.jsp?arnumber=5380397.*

Yi Bo Huang, "An item based collaborative filtering using item clustering prediction," 2009 Computing, Communication, Control, and Management, 2009. CCCM 2009. ISECS International Colloquium http://ieeexplore.ieee.org/xpls/abs_all.jsp?arnumber=5267821&tag=1.*

Y. Huang, "An item based collaborative filtering using item clustering prediction," 2009 ISECS International Colloquium on Computing, Communication, Control, and Management, Sanya, 2009, pp. 54-56. URL: http://ieeexplore.ieee.org/stamp/stamp.jsp?tp=&arnumber=5267821&isnumber=5267482 (Year: 2009).*

Steven M. Drucker et al; Helping Users Sort Faster with Adaptive Machine Learning Recommendations; INTERACT'11 Proceedings of the 13th IFIP TC 13 international conference on Human-computer interaction—vol. Part III; pp. 187-203; Published Date: Sep. 5-9, 2011.

Lei Li et al; LOGO: A Long-Short User Interest Integration in Personalized News Recommendation; RecSys'11, Oct. 23-27, 2011, Chicago, Illinois, USA; pp. 317-320; Published Date: Oct. 23-27, 2011.

"Final Office Action Issued in U.S. Appl. No. 13/400,581", dated Sep. 9, 2014, 21 Pages.

"Final Office Action Issued in U.S. Appl. No. 13/400,581", dated Aug. 16, 2013, 21 Pages.

"Non-Final Office Action Issued in U.S. Appl. No. 13/400,581", dated Feb. 26, 2014, 19 Pages.

"Non-Final Office Action Issued in U.S. Appl. No. 13/400,581", dated Mar. 29, 2013, 20 Pages.

"Non-Final Office Action Issued in U.S. Appl. No. 13/400,581", dated Apr. 8, 2015, 15 Pages.

"Non-Final Office Action Issued in U.S. Appl. No. 15/098,366", dated May 9, 2018, 11 Pages.

Billsus, et al., "Learning Collaborative Information Filters", In Proceedings of ICML, Jul. 24, 1998, 5 Pages.

Deshpande, et al., "Item-based Top-N Recommendation Algorithms", In Proceedings of ICML, Jan. 1, 2004, pp. 143-177.

Devi, et al., "Applications of Association Rule Mining in Different Databases", In Journal of Global Research in Computer Science, vol. 3, Issue 8, Aug. 2012, pp. 30-34.

Grigorik, Ilya, "SVD Recommendation System in Ruby", Retrieved from: https://www.igvita.com/2007/01/15/svd-recommendation-system-in-ruby/, Jan. 15, 2007, 5 Pages.

Shepitsen, et al., "Personalized Recommendation in Social Tagging Systems Using Hierarchical Clustering", In Proceedings of the 2008 ACM Conference on Recommender Systems, Oct. 23-25, 2008, 8 Pages.

Shinde, et al., "Hybrid Personalized Recommender System Using Modified Fuzzy C-Means Clustering Algorithm", In Proceedings of the International Journal of Artificial Intelligence and Expert Systems (IJAE), vol. (1), Issue (4), Feb. 8, 2001, pp. 88-99.

Tatli, et al., "A Tag-based Hybrid Music Recommendation System Using Semantic Relations and Multi-domain Information", In Proceedings of the 11th IEEE International Conference on Data Mining Workshops, Dec. 11, 2011, 7 Pages.

"Final Office Action Issued in U.S. Appl. No. 15/098,366", dated Dec. 14, 2018, 13 Pages.

* cited by examiner

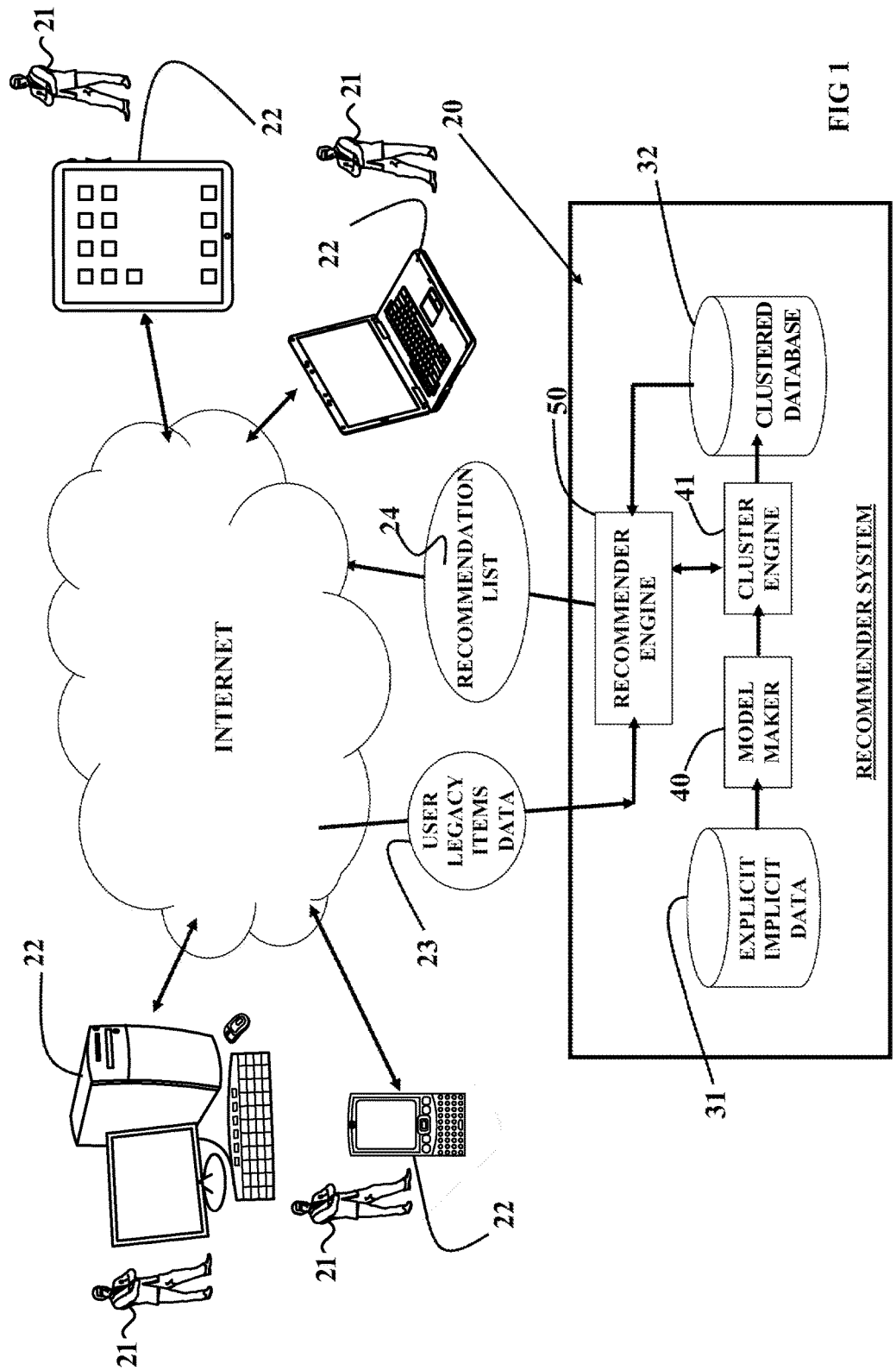

RECOMMENDER SYSTEM

TECHNICAL FIELD

Embodiments of the invention relate to methods of recommending items for a person's use.

BACKGROUND

Modern communication networks, such as mobile phone networks and the Internet, and the plethora of devices that provide access to services that they provide have not only made people intensely aware of each other, but have inundated them with a surfeit of information and options for satisfying any from the simplest to the most complex needs and desires. Whereas in the not too distant past, information available to an individual was relatively sparse and generally expensive in time and/or resources to acquire, today, information—wanted and unwanted—is relatively inexpensive. All too often, the information is overwhelmingly abundant and diluted with irrelevant information.

For example, today a person interested in choosing a movie may receive for review via the Internet and mobile phone or cable networks, a bewildering number of recommendations for many tens, if not hundreds, of movies. Each movie may be accompanied with options for viewing at home, at conventional movie theaters, on a desktop computer, laptop, notebook, and/or on a smartphone. A person in transit, on foot or in a vehicle, using a laptop or smartphone, can easily request suggestions for a choice of coffee shops or restaurants to patronize, and may receive a list of recommended suggestions of confusing length. Whereas, the cost of acquiring information appears to have plummeted, the task of managing its copiousness and various options to determine its relevance has become an increasingly complex and expensive task.

Various recommender systems and algorithms have been developed to attempt to deal with the challenges and opportunities that the abundance of information has generated, and to automatically focus and filter information to match a business's, organization's or person's, interests and needs. The systems and algorithms typically acquire and process explicit and/or implicit data acquired for people to determine characteristics of the people and their consumer histories that may be used to infer their preferences for various information, products, and/or activities, generically referred to as "items".

Explicit data comprises information that a person consciously provides responsive to explicit requests for the information. Implicit data comprises data acquired responsive to observations of a person's behavior that are not consciously generated in response to an explicit request for information. The characteristics and/or their representations are used to configure and filter information recommended to a person to improve relevance of the recommended information and reduce an amount of irrelevant data that accompanies and dilutes the information.

Common recommender algorithms for automatically inferring and recommending items that a person might be interested in are algorithms referred to as "collaborative filtering" and "content-based filtering" algorithms. A recommender system using a collaborative filtering algorithm recommends an item to an individual if persons sharing a commonality of preferences with the individual have exhibited a preference for the item. For example, if the individual has shown a preference for item "A" in the past, and persons in the database who have shown preference for item A have also shown preference for an item "B", then item B may preferentially be recommended to the individual. In accordance with a content-based filtering algorithm, a recommender system recommends an item to an individual if the item shares a similarity with items previously preferred by the individual. For example, if the individual has shown a preference for action movies, the algorithm may preferentially recommend an action movie to the individual.

SUMMARY

An aspect of an embodiment of the invention, relates to providing a recommender system that recommends an item to a user responsive to correspondence between items preferred by the user in the past with clusters of items defined for a plurality of items. The clusters group related items and may be generated as functions of preferences expressed by a population of people and/or characteristics that the items share. Hereinafter, the plurality of items is also referred to as a "catalog" of items and items in the catalog may be referred to as "catalog items".

In an embodiment of the invention, the recommender system processes explicit and/or implicit data acquired for the population of people and the catalog of items to define and "parse" the catalog of items into clusters of items and associate catalog items with the clusters in accordance with a clustering algorithm. To determine item recommendations for the user, the recommender system associates items, hereinafter "user legacy items", preferred by the user in the past with catalog clusters to which they belong. A catalog cluster associated with a user legacy item is referred to as a "tagged" catalog cluster. The recommender system chooses catalog items to recommend to the user from among catalog items in tagged catalog clusters.

In an embodiment of the invention, the recommender system chooses catalog items to be recommended from catalog clusters that are not tagged, but are related to tagged catalog clusters by a shared characteristic. Optionally, the recommender system does not recommend catalog items from catalog clusters that are not tagged. The recommender system may recommend catalog items from different tagged and/or untagged catalog clusters to provide the user with a selection of recommended items exhibiting enhanced variety.

A catalog item chosen from a tagged catalog cluster for recommendation to the user in accordance with an embodiment of the invention may be a catalog item that satisfies a recommendation constraint. In an embodiment of the invention, trait vectors having components that are determined responsive to preference rankings for catalog items exhibited by a population of people represent catalog and user legacy items. Optionally, the recommendation constraint comprises at least one constraint on an inner product of a trait vector representing a recommended catalog item and a trait vector representing a user legacy item. The at least one constraint on the inner product may comprise a constraint that a magnitude of the inner product be greater than a given threshold magnitude. The at least one constraint on the inner product may comprise a constraint that a magnitude of the inner product normalized to magnitudes of the trait vectors be greater than a given threshold magnitude. The recommendation constraint may require that a recommended catalog item have an order greater than a given order in a set of catalog items ordered with respect to magnitudes of their inner products with a trait vector representing a user legacy item.

Optionally, the recommendation constraint comprises a content constraint and the recommender system chooses a catalog item from a tagged catalog cluster to recommend to a user by filtering the tagged catalog cluster using a content-based filtering algorithm. In an embodiment of the invention, the recommendation constraint comprises a collaborative filtering requirement and a recommended catalog item may be an item chosen from a tagged catalog cluster by filtering the tagged catalog using a collaborative filtering algorithm.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

FIG. 1 shows a recommender systems for recommending items to a user responsive to catalog clusters, in accordance with an embodiment of the invention;

DETAILED DESCRIPTION

Figure 2A:
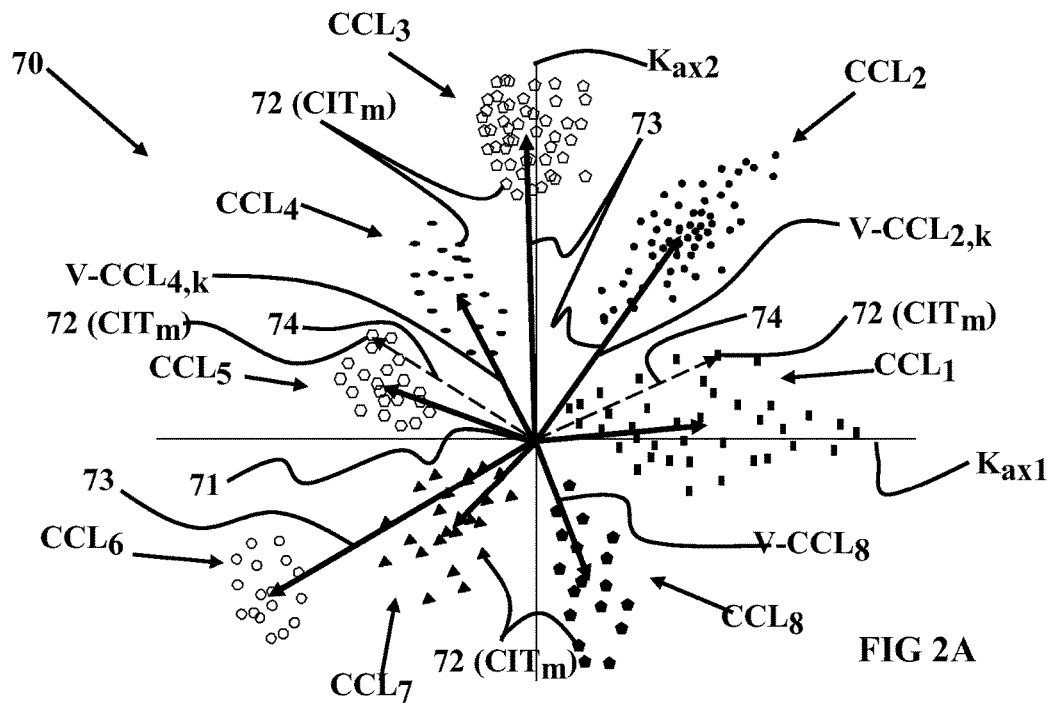
FIG. 2A schematically shows a plurality of catalog items that have been clustered into catalog clusters, in accordance with an embodiment of the invention.
Figure 2B:
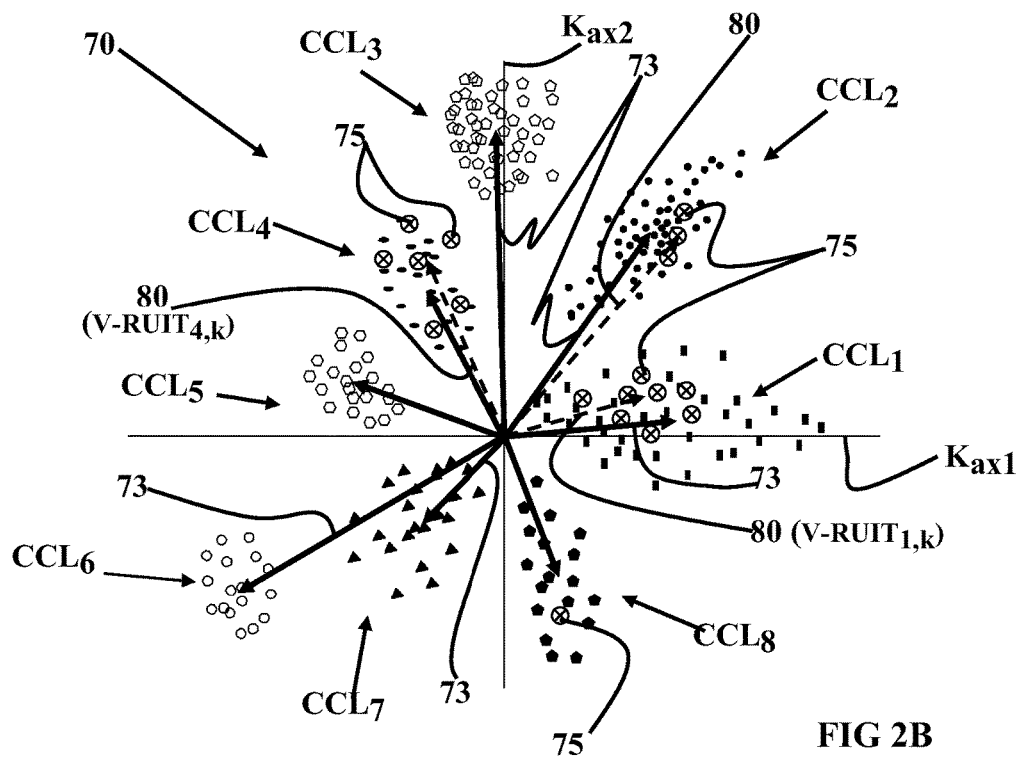
FIG. 2B schematically shows the catalog clusters shown in FIG. 2A with a sparse distribution of user legacy items, in accordance with an embodiment of the invention.
Figure 3:
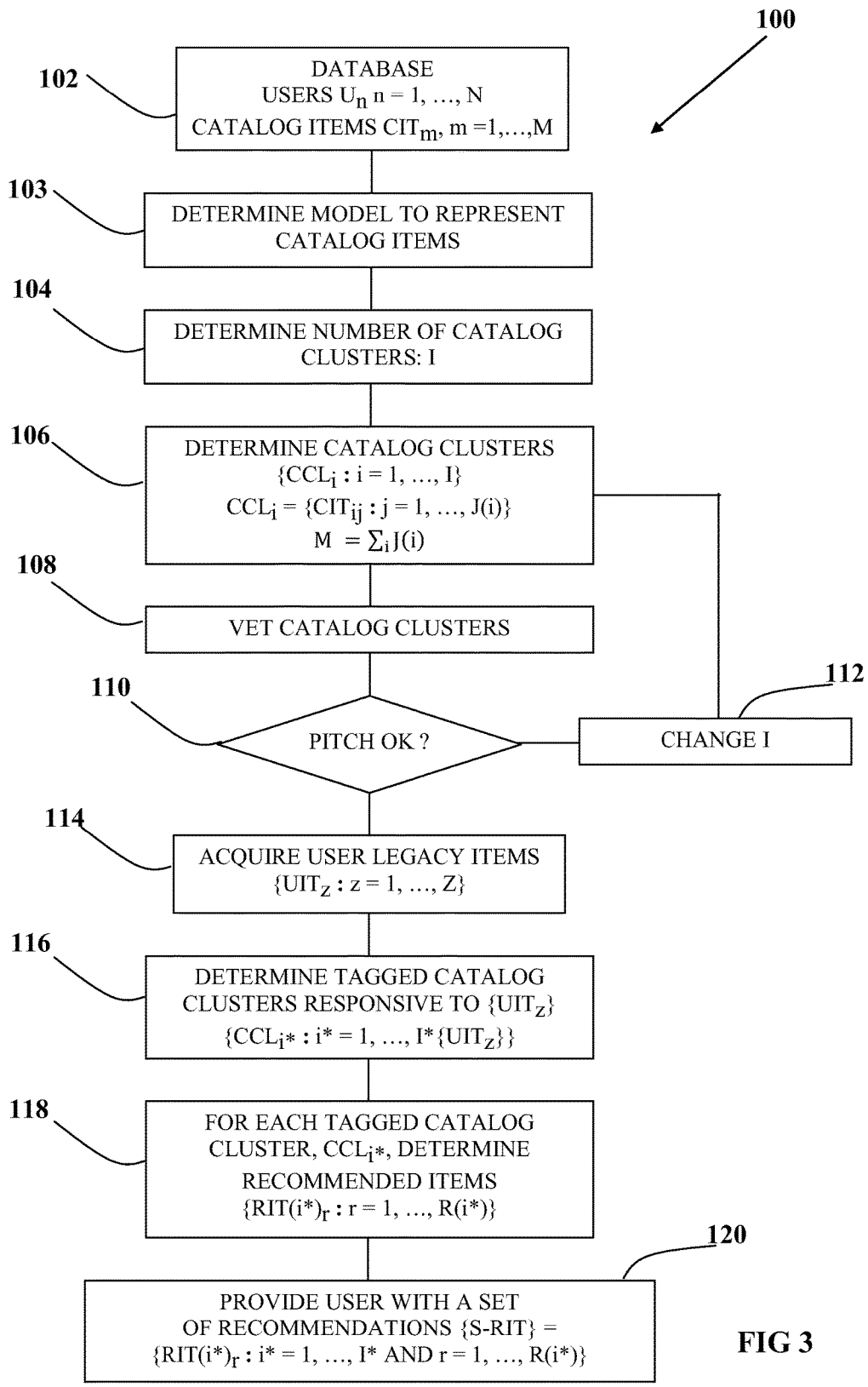
FIG. 3 shows a flow diagram of a method by which the recommender system shown in FIG. 1 determines items to recommend to a user, in accordance with an embodiment of the invention.

In the discussion below, components of a recommender system in accordance with an embodiment of the invention are discussed with reference to FIG. 1. FIGS. 2A and 2B graphically illustrate catalog clusters optionally generated by representing catalog clusters with trait vectors and using a clustering algorithm, such as a k-means algorithm, to group catalog items into clusters. FIG. 3 shows a flow diagram that provides details of operation of the recommender system in accordance with an embodiment of the invention.

FIG. 1 schematically shows a recommender system 20 operating to provide recommendations to users 21 that may access the recommender system using any of various stationary or mobile communication devices, such as by way of example, a smartphone, laptop, notebook, or desktop computer. A user 21 may be any person who accesses recommender system 20, is accessed by the recommender system, and/or contributes explicit or implicit data to the recommender system. A numeral 22 labels the communication devices. Access to the recommender system may be via any suitable communication network to which the communication devices may connect, such as the Internet, a mobile phone network, or local area network (LAN). For convenience of presentation, the communication devices are schematically shown as communicating with recommender system 20 via the Internet.

Recommender system 20 optionally comprises an "explicit-implicit database" 31 comprising explicit and/or implicit data acquired responsive to preferences exhibited by a population of users 21 for items in a catalog of items. Recommender system 20 may comprise a model maker 40 and a cluster engine 41 that cooperate to cluster related catalog items in catalog clusters and generate a clustered database 32. A recommender engine 50 recommends catalog items from catalog clusters in clustered database 32.

Optionally, the population comprises at least about a 1000 users 21. In an embodiment of the invention, the population may comprise at least about 100,000 users 21. Optionally, the population is equal to or greater than about 1,000,000 users 21. In an embodiment of the invention, the number of items in the catalog is equal to or greater than about 500 catalog items. Optionally, the number of items is equal to or greater than about 5,000 catalog items. In an embodiment, the number of items in the catalog is greater than or equal to about 10,000 catalog items.

Explicit data optionally comprised in explicit-implicit database 31 includes information acquired by recommender system 20 responsive to explicit requests for information submitted to users 21 in the population. Explicit requests for information may comprise, by way of example, questions in a questionnaire, requests to rank a book or movie for its entertainment value, or requests to express an opinion on quality of a product. Implicit data optionally comprised in explicit-implicit database 31 includes data acquired by the recommender system responsive to observations of behavior of users 21 in the population that is not consciously generated by an explicit request for information. For example, implicit data may comprise data responsive to determining which catalog items a user 21 in the population views in an online store, how long a user 21 focuses on a particular catalog item, or to determining a pattern that a user 21 exhibits in choosing catalog items.

Model maker 40 processes explicit and/or implicit data comprised in explicit-implicit database 31 to implement a model for representing catalog items that represents each of the catalog items by a representation usable to cluster the catalog items. Cluster engine 41 processes the representations of the catalog items provided by model maker 40 to generate "clustered database" 32 in which the plurality of catalog items is clustered into catalog clusters, each of which groups a different set of related catalog items. Whereas FIG. 1 schematically shows explicit-implicit database 31 as separate from clustered database 32, clustered database 32 may be comprised in explicit-implicit database 31. To generate clustered database 32, cluster engine 41 may for example simply mark records in explicit-implicit database 31 to indicate clusters with which the records are associated.

Any of various models for providing representations of catalog items and methods of processing the representations to cluster the catalog items and generate clustered database 32 may be used in practice of an embodiment of the invention. Model maker 40 may for example generate representations of catalog items that are based on feature vectors. Optionally, model maker 40 represents catalog items by vectors in a space spanned by eigenvectors, which are determined from a singular value decomposition (SVD) of a "ranking matrix" representing preferences of users 21 for the catalog items. Model maker 40 may represent catalog items by trait vectors in a latent space determined by matrix factorization of a ranking matrix.

Cluster engine 41 optionally clusters catalog items in a same catalog cluster if same users exhibit similar preferences for the catalog items. Optionally, cluster engine 41 uses a classifier, such as a support vector machine, trained on a subset of the catalog items to distinguish catalog items and cluster catalog items into catalog clusters. In an embodiment of the invention, cluster engine 41 uses an iterative k-means clustering algorithm to cluster vectors representing catalog items and generate clustered database 32.

Whereas FIG. 1 schematically shows components of recommender system 20 inside a same frame, which may represent a server, the frame is not intended to indicate that the components have to be housed together or to be comprised in a same server. Practice of an embodiment of the invention is not limited to "centralized" recommender systems in which a same device houses all, or substantially all, the recommender system components or to recommender systems for which all the components are located at a same location. A recommender system in accordance with an embodiment of the invention may have a distributed configuration with hardware and software components at different locations. For example, explicit-implicit database 31 may reside in at least one first server, and recommender engine 41 may reside in at least one second server at a location different from a location of the at least one first server. Recommender system 20 may be cloud based and comprise components and processor executable instruction sets distributed over the Internet.

FIG. 2A shows schematic, graphical representations of, "I", catalog clusters "$CCL_i$", $1 \leq i \leq I$, provided by cluster engine 41 operating on representations provided by model maker 40 for "M" catalog items, "$CIT_m$", $1 \leq m \leq M$, in a catalog of items, in accordance with an embodiment of the invention. Catalog items $CIT_m$ may be represented by trait vectors in a latent space of "K" dimensions for which K for example may be larger than 10 or may be larger than 50. In the discussion that follows, trait vectors are indicated by a prefix "V-" and a subscript "k" added to an alphanumeric that is used to identify an item represented by the trait vector. A trait vector $V\text{-}CIT_{m,k}$, $1 \leq k \leq K$ for example represents a catalog item $CIT_m$.

For convenience of presentation, in FIG. 2A catalog items $CIT_m$ are assumed to be represented by two dimensional trait vectors and are graphically represented by various filled and unfilled geometric icons 72 mapped onto a two dimensional latent space 70. The latent space has an origin 71 and trait axes $K_{ax1}$ and $K_{ax2}$. A trait vector $V\text{-}CIT_{m,k}$ for a given catalog item $CIT_m$ represented by a given icon 72 extends from origin 71 to the given icon. FIG. 2A schematically shows dashed arrows 74 graphically representing trait vectors for two catalog items.

In FIG. 2A, the number I of catalog clusters $CCL_i$ into which catalog items $CIT_m$ are clustered is arbitrarily shown equal to eight. Practice of the invention is of course not limited to eight catalog clusters and a number of catalog clusters may be larger or smaller than the number shown in the figure. Each catalog cluster $CCL_i$ is schematically shown comprising a group of catalog items $CIT_m$ that are relatively close to each other in latent space 70 and are represented by a same geometric icon, which is different from the geometric icons representing catalog items in other clusters.

Optionally, cluster engine 41 generates a catalog cluster trait vector "$V\text{-}CCL_{i,k}$," also referred to as a "cluster vector", for each catalog cluster $CCL_i$. A cluster vector $V\text{-}CCL_{i,k}$ represents catalog cluster $CCL_i$ in latent space 70, and is a function of trait vectors $V\text{-}CIT_{m,k}$ representing catalog items $CIT_m$ in the catalog cluster. Solid arrows 73 extending from origin 71 of latent space 70 schematically represent cluster vectors $V\text{-}CCL_{i,k}$ in FIG. 2A. Some arrows 73 representing cluster vectors are also labeled with the alphanumeric designations, $V\text{-}CCL_{i,k}$, of the cluster vectors they represent.

By way of example, cluster vector $V\text{-}CCL_{i,k}$ may be an average or weighted average of trait vectors $V\text{-}CIT_{m,k}$. Optionally, cluster vector $V\text{-}CCL_{i,k}$ 73 for a catalog cluster is a latent space vector that extends to a centroid (not shown) of the catalog cluster. For embodiments in which clustering is performed using a k-means algorithm, cluster vectors may be "centroid vectors", which are used in a last iteration of the algorithm for which the clustering procedure is considered to have converged.

In an embodiment of the invention, cluster vectors $V\text{-}CCL_{i,k}$ may be used to configure a map of catalog clusters into which catalog items $CIT_m$ are clustered. For example, a number of catalog clusters $CCL_i$ into which catalog items are clustered may be determined by requiring that different catalog clusters group catalog items of a desired degree of dissimilarity. The requirement may be implemented by requiring that an inner product of any two catalog cluster trait vectors $V\text{-}CCL_{i,k}$ have magnitude less than a given maximum magnitude. Alternatively or additionally, it may be required that all catalog items in a given catalog cluster exhibit a desired degree of similarity. The similarity requirement may be implemented by requiring that an inner product of the given catalog cluster's cluster vector $V\text{-}CCL_{i,k}$ 73 and the trait vector $V\text{-}CIT_{m,k}$ of a catalog item in the catalog cluster be greater than a desired magnitude.

In an embodiment of the invention, recommender engine 50 recommends catalog items to a given user 21, responsive to correlations of the given user's past preferences for items and the catalog clusters determined by cluster engine 41. Optionally, the recommender engine processes a plurality of, "Z", user legacy items, "$UIT_z$", $1 \leq z \leq Z$, which are items for which the given user has expressed a preference in the past, to correlate past preferences with catalog clusters. In FIG. 1 recommender engine 50 is shown by way of example, receiving via the Internet, user legacy item data 23 that identifies user legacy items $UIT_z$ for the given user 21. A source for the user legacy item data may for example be data stored in the given user's desktop computer, smart phone, or purchase records at various online or brick and mortar stores. In an embodiment of the invention, user legacy items $UIT_z$ associated with the given user 21 are catalog items in clustered database 32 that are designated in the database as belonging to the given user's legacy items. Recommender engine 50 determines that a catalog cluster $CCL_i$ is correlated to past preferences exhibited by the given user 21, and is to be identified as a tagged catalog cluster, if at least one given user legacy item $UIT_z$ belongs to the catalog cluster.

FIG. 2B schematically shows user legacy items $UIT_z$ for the given user 21 mapped onto latent space 70 shown in FIG. 2A onto which catalog clusters $CCL_i$ are mapped. The given user's legacy items $UIT_z$ are graphically represented by "x-circles" 75, which are by way of example, located in catalog clusters $CCL_1$, $CCL_2$, $CCL_4$, and $CCL_8$. Recommender engine 50 determines that catalog clusters $CCL_1$, $CCL_2$, $CCL_4$, and $CCL_8$ are tagged catalog clusters because they comprise user legacy items associated with given user 21.

In an embodiment of the invention, recommender engine 50 chooses catalog items to be recommended to the given user 21 from the tagged catalog clusters and may employ any of various methods to choose a catalog item from a given tagged catalog cluster from among $CCL_1$, $CCL_2$, $CCL_4$, or $CCL_8$ for recommendation.

For example, in an embodiment, to choose a catalog item from an i*-th tagged catalog cluster "$CCL_{i*}$", recommender engine 50 may define a representative legacy trait vector, "$V\text{-}RUIT_{i*,k}$", as a trait vector representative of user legacy items located in the i*-th tagged catalog cluster. (Hereinafter, an asterisk on an index, such as the index "i", of an indexed symbol indicates that the indexed symbol refers to a tagged catalog cluster or an object associated with a tagged catalog cluster.) Representative legacy trait vector $V\text{-}RUIT_{i*,k}$ is optionally an average or weighted average of legacy trait vectors $V\text{-}UIT_{z,k}$ of user legacy items $UIT_{z,k}$ comprised in tagged catalog cluster $CCL_{i*}$. In FIG. 2B, legacy trait vectors $V\text{-}RUIT_{i*,k}$ (i*=1, 2, 4, and 8) are graphically represented by dashed arrows 80, some of which are also labeled by their respective alphanumeric designations.

Optionally, a catalog item $CIT_m$ that is chosen for recommendation from tagged catalog cluster $CCL_{i*}$, is a catalog item for which an inner product of its trait vector $V\text{-}CIT_{m,k}$ and representative legacy trait vector $V\text{-}RUIT_{i*,k}$ has a magnitude greater than a desired minimum magnitude. Optionally, the minimum magnitude is not the same for all tagged catalog clusters $CCL_{i*}$ and the minimum magnitude is smaller for tagged catalog clusters found to include a greater number of user legacy items $UIT_Z$. In an embodiment, recommender engine 50 operates to recommend catalog items $CIT_m$ from a tagged catalog cluster $CCL_{i*}$ responsive to a distance between the catalog cluster's cluster vector $V\text{-}CCL_{i*,k}$ and the cluster's representative legacy trait vector $V\text{-}RUIT_{i*,k}$. Catalog items may be chosen for recommendation from those catalog items for which their trait vectors $V\text{-}CIT_{m,k}$ have an inner product with representative legacy trait vector $V\text{-}RUIT_{i*,k}$ that is greater than that between the cluster vector $V\text{-}CCL_{i*,k}$ and representative legacy trait vector $V\text{-}RUIT_{i*,k}$.

By way of yet another example, recommender engine 50 may apply a collaborative filtering algorithm to catalog items $CIT_m$ comprised in a tagged catalog cluster $CCL_{i*}$ to choose a catalog item from the tagged cluster for recommendation to the user.

In an embodiment, recommended catalog items are drawn from a catalog cluster $CCL_i$ that is not tagged by a presence of a user legacy item $UIT_Z$, but is characterized by satisfying a proximity constraint, which is a function of a metric that defines a distance between any two catalog clusters $CCL_i$. The metric may be a magnitude of an inner product between cluster vectors $V\text{-}CCL_{i,k}$ 73 of the two catalog clusters. Optionally, the constraint requires that a distance between the non-tagged catalog cluster $CCL_i$ and at least one tagged catalog cluster $CCL_{i*}$ be less than a desired upper bound distance. A catalog cluster $CCL_i$ that satisfies the constraint may be referred to as a "related catalog cluster".

In an embodiment of the invention, catalog items are chosen for recommendation from related catalog clusters responsive to their respective distances from a tagged catalog cluster. For example, more catalog items may be chosen for recommendation from related catalog clusters closer to a tagged catalog cluster than from related catalog clusters farther from a tagged catalog cluster. In an embodiment of the invention, the constraint requires that a distance between the non-tagged catalog cluster and each of two tagged catalog clusters be less than a desired upper bound distance. For example, non-tagged catalog cluster $CCL_3$ in FIG. 2B is bracketed by tagged catalog clusters $CCL_2$ and $CCL_4$ and may qualify as a related catalog cluster.

After recommender engine 50 chooses catalog items $CIT_m$ for recommendation from tagged, and optionally related catalog clusters, the recommender engine compiles a recommendation list of items to be recommended to the given user. Optionally, not all catalog items chosen for recommendation are included in the recommendation list. In an embodiment of the invention, a number of recommended catalog items $CIT_m$ from each tagged catalog cluster $CCL_{i*}$ included in the recommendation list is responsive to a number of user legacy items $UIT_Z$ found to be included in the catalog cluster. Optionally, the number of catalog items $CIT_m$ from a tagged catalog cluster $CCL_{i*}$ included in the recommendation list is greater for tagged catalog clusters that include a greater number of user legacy items $UIT_Z$. FIG. 1 schematically shows recommender engine 50 forwarding a recommendation list 24 to the given user 21 via the Internet.

FIG. 3 shows a flow diagram 100 that provides details of an algorithm by which recommender system 20 generates a recommendation list, such as recommendation list 24 shown in FIG. 1, for a user 21, in accordance with an embodiment of the invention.

In a block 102, recommender system 20 acquires an explicit-implicit database 31 comprising explicit and/or implicit data for users $U_n$, n=1, . . . N, and catalog items $CIT_m$, m=1, . . . , M. In a block 103 recommender system 20 determines a model for representing catalog items $CIT_m$ and provides each catalog item $CIT_m$ with a representation that may be used to cluster the catalog item.

In a block 104, a trial number "I" of catalog clusters into which catalog items $CIT_m$ are to be clustered is initialized, and in a block 106 the recommender system defines catalog clusters $CCL_i$, i=1, . . . , I, and clusters catalog items into the defined clusters. A catalog cluster $CCL_i$ comprises a subset of the catalog items having J(i) catalog items and may be defined by an expression $CCL_i = \{CIT_{i,j} : j=1, \ldots, J(i)\}$. A sum of catalog items J(i) in the catalog cluster is equal to the total number of catalog items M, and in symbols $M = \Sigma_i J(i)$.

Any of various models and methods may be used to configure and process data in explicit-implicit database 31 to represent catalog items $CIT_m$ and provide catalog clusters $CCL_i$. By way of example, in an embodiment, explicit-implicit database 31 comprises values of preference rankings for "M" items by "N" users, which are conveniently configured as an N×M matrix, a "ranking matrix", $RNK_{n,m}$ (1≤n≤N, 1≤m≤M). In an embodiment of the invention, recommender system 20 assumes a latent space of "K" dimensions to represent catalog items $CIT_m$ and factors ranking matrix $RNK_{n,m}$ to determine a trait vector $V\text{-}CIT_{m,k}$, 1≤k≤K for each catalog item $CIT_m$.

Recommender system 20 optionally clusters catalog items $CIT_m$ by clustering trait vectors $V\text{-}CIT_{m,k}$ in accordance with a k-means clustering algorithm. In a k-means algorithm, an initial set of I "clustering-vectors", one for each of the I catalog clusters into which it is desired to cluster catalog items $CIT_m$, is optionally randomly determined. Each trait vector $V\text{-}CIT_{m,k}$ is then clustered with the initial clustering vector for which its inner product is largest to form a first set of catalog clusters. For each catalog cluster in the first set of catalog clusters a new first iteration clustering vector is determined. Optionally, the new first iteration clustering vector is a vector that is an average or centroid vector of the trait vectors $V\text{-}CIT_{m,k}$ in the cluster. The trait vectors V-CIT$_{m,k}$ are clustered a second time using the first iteration clustering-vectors to determine a new, second set of catalog clusters and a second iteration clustering vector for each catalog cluster in the second set of catalog clusters. Iterations are continued until the procedure converges to an acceptable set of catalog clusters and cluster vectors V-CCL$_{i,k}$.

In a block 108 recommender system 20 vets the catalog clusters to determine if the clusters include clusters that are too similar or too dissimilar. For example, in an embodiment of the invention, after generating catalog clusters CCL$_i$ and their representative cluster vectors V-CCL$_{i,k}$ (vectors 73 in FIG. 2A), cluster engine 41 (FIG. 1) may calculate inner products between the cluster vectors V-CCL$_{i,k}$. In a decision block 110 the cluster engine may then determine if the magnitudes of the calculated inner products have values in an acceptable range of magnitudes limited by lower and upper bound magnitudes. If magnitudes of inner products are outside of the acceptable range, optionally in a block 112 recommender system 20 changes "I" to a new value. Optionally, the recommender system increases or decreases the value of I if an unacceptable number of the calculated inner products have magnitudes less than or greater than the lower and upper bounds respectively of the acceptable range.

If on the other hand, in decision block 110 recommender system 20 determines that the inner products have satisfactory magnitudes, the recommender system optionally proceeds to a block 114 and acquires data identifying user legacy items UIT$_Z$, 1≤z≤Z. In a block 116, the recommender system determines to which catalog clusters CCL$_i$ each of the user legacy items UIT$_Z$ (represented by x-circles 75 in FIG. 2B) belongs and identifies tagged catalog clusters CCL$_{i*}$ as catalog clusters comprising at least one legacy item UIT$_Z$. In a block 118 recommender system 20 chooses from each tagged catalog cluster, CCL$_{i*}$, "R(i*)" catalog items "RIT(i*)$_r$," 1≤r≤R(i*) for recommendation to the user.

As noted above in the discussion of FIG. 1 and FIGS. 2A and 2B, any of various methods and constraints, may be used to choose catalog items RIT(i*)$_r$ for recommendation to the user, in accordance with an embodiment of the invention. Optionally, R(i*), the number of catalog items chosen from the i*-th tagged catalog cluster is constrained responsive to characteristics of the tagged catalog cluster. For example, R(i*) may be determined to be larger for tagged catalog clusters CCL$_{i*}$ comprising a larger number of catalog items, or for tagged catalog clusters comprising a larger number of user legacy items UIT$_Z$. Optionally, a catalog item is chosen from a tagged catalog cluster CCL$_{i*}$ for recommendation if an inner product of a trait vector representing the catalog item and a representative legacy trait vector V-RUIT$_{i*,k}$ (represented by dashed arrows 80 in FIG. 2B) associated with user legacy items in the tagged catalog cluster is greater than a desired minimum magnitude.

In a block 120, recommender system 20 optionally compiles all recommended items RIT(i*)$_r$ from all tagged catalog clusters CCL$_{i*}$ into a recommendation set {S-RIT}={RIT(i*)$_r$:i*=1, . . . , I* and r=1, . . . , R(i*)} for transmission to the user. Optionally, less than all of the catalog items chosen for recommendation are included in a recommendation set. For example, a user may request a list of recommendations limited to a number less than a total number of items determined eligible for recommendation.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of recommending items to a user, the method comprising:
   clustering, by one or more processors, catalog items in a catalog into a plurality of catalog clusters of catalog items in a coordinate system responsive to preferences exhibited by a population of users, wherein the coordinate system comprises an origin point;
   representing, by the one or more processors, each catalog item by a trait vector from the origin point;
   determining, by the one or more processors, for each catalog cluster a catalog cluster trait vector, from the origin point, based on trait vectors of catalog items in the cluster;
   determining, by the one or more processors, user legacy items belonging in each catalog cluster;
   representing, by the one or more processors, each user legacy item by a trait vector from the origin point;
   determining, by the one or more processors, for each catalog cluster a representative legacy trait vector, from the origin point, that is a function of and representative of the trait vectors of the user legacy items determined to belong in the catalog cluster;
   recommending, by the one or more processors, a catalog item in a catalog cluster when an inner product of the trait vector, from the origin point, of the catalog item and the representative legacy trait vector, from the origin point, is greater than the inner product between the representative legacy trait vector, from the origin point, and the cluster trait vector, from the origin point; and
   transmitting, by the one or more processors over a network, the recommended catalog item to a computing device for presentation of the recommended catalog item to a user.

2. A method according to claim 1, further comprising using a metric that provides a measure of distance between any two catalog clusters of the plurality of clusters used to recommend a catalog item to the user.

3. A method according to claim 2, wherein using the metric comprises determining distances between catalog clusters of the plurality of catalog clusters and identifying a catalog cluster of the plurality of catalog clusters to which a legacy item does not belong that has a determined distance less than a desired distance to at least one catalog cluster of the plurality of catalog clusters to which a legacy item does belong.

4. A method according to claim 3, further comprising recommending an item from the identified catalog cluster that does not comprise a legacy item.

5. A method according to claim 1, wherein clustering catalog items comprises acquiring rankings of the catalog items for a population of people and using the rankings to cluster the catalog items.

6. A method according to claim 5, wherein using the rankings comprises factoring a ranking matrix comprising the rankings to determine a trait vector to represent each catalog item.

7. A method according to claim 6, further comprising using the trait vectors to cluster the catalog items into the plurality of clusters.

8. A method according to claim 7, wherein using the trait vectors to cluster catalog items comprises clustering the trait vectors responsive to inner products of the trait vectors.

9. A method according to claim 8, wherein clustering responsive to the inner products comprises using a k-means algorithm.

10. A method according to claim 1, wherein clustering catalog items comprises using a collaborative filtering algorithm to cluster the catalog items.

11. A system, comprising:
a database having data responsive to preferences exhibited by a population of users;
one or more processors;
memory embodied with instructions executable by the one or more processors for:
generating a clustered database comprising a plurality of catalog clusters of the catalog items responsive to the data in the database in a coordinate system comprising an origin point;
identifying user legacy items previously preferred by a user;
determining identified user legacy items belonging in each catalog cluster;
representing each legacy item by a trait vector from the origin point;
determining for each catalog cluster a representative legacy trait vector, from the origin point, that is a function and representative of the trait vectors of the legacy item trait vectors in the catalog cluster;
determining for each catalog cluster a cluster trait vector, from the origin point, based on the trait vectors of catalog items in the cluster;
recommending a catalog item in a catalog cluster when an inner product of the trait vector of the catalog item and the representative legacy trait vector is greater than the inner product between the representative legacy trait vector and the cluster trait vector; and
transmitting, over a network, the recommended catalog item to a computing device for presentation of the recommended catalog item to a user.

12. The system according to claim 11, wherein the memory is further embodied with executable instructions for providing a representation for each catalog item that the cluster engine uses to generate the clustered database.

13. The system according to claim 12 wherein the memory is further embodied with executable instructions for modeling the catalog items as trait vectors in a latent space and generates a representation for each catalog item that comprises a trait vector.

14. The system according to claim 13, the trait vectors are used to generate the clustered database.

15. The system according to claim 11, wherein the catalog items are clustered using a collaborative filtering algorithm.

16. The system according to claim 11 wherein the recommender engine:
determines distances between catalog clusters of the plurality of clusters responsive to a metric;
identifies a catalog cluster of the plurality of catalog clusters to which a legacy item does not belong and which has a determined distance less than a desired distance to at least one catalog cluster of the plurality of catalog clusters to which a legacy item does belong; and
recommends a catalog item from the identified catalog cluster to which a legacy item does not belong.

17. A method, comprising:
clustering, by one or more processors, catalog items in a catalog into a plurality of catalog clusters of catalog items in a coordinate system responsive to preferences exhibited by a population of users;
representing, by the one or more processors, catalog items by trait vectors;
determining, by the one or more processors, for at least a subset of the catalog clusters a catalog cluster trait vector based on trait vectors of catalog items in the subset of the catalog of clusters;
determining, by the one or more processors, user legacy items belonging for the subset of the catalog of clusters, wherein the user legacy items represent items users have expressed preferences in previous periods of time;
representing, by the one or more processors, the user legacy items by trait vectors in the coordinate system;
determining, by the one or more processors, for each catalog cluster a representative legacy trait vector that is a function of and representative of the trait vectors of the user legacy items determined to belong in the catalog cluster;
recommending, by the one or more processors, a catalog item in a catalog cluster when an inner product of the trait vector of the catalog item and the representative legacy trait vector, from the origin point, is greater than the inner product between the representative legacy trait vector, from the origin point, and the cluster trait vector; and
transmitting, by the one or more processors over a network, the recommended catalog item to a computing device for presentation of the recommended catalog item to a user.

18. A method according to claim 17 wherein said clustering catalog items comprises acquiring rankings of the catalog items for a population of people and using the rankings to cluster the catalog items.

19. A method according to claim 18 wherein use of the rankings comprises factoring a ranking matrix comprising the rankings to determine a trait vector to represent catalog items.

20. A method according to claim 19, further comprising using the trait vectors to cluster the catalog items into the plurality of clusters.

* * * * *